US006966986B1

(12) United States Patent
Lackey

(10) Patent No.: US 6,966,986 B1
(45) Date of Patent: Nov. 22, 2005

(54) UNDER THE COUNTER FILTER INSTALLATION

(75) Inventor: Robert W. Lackey, Hickory, NC (US)

(73) Assignee: RWL Corporation, Hickory, NC (US)

( * ) Notice: Subject to any disclaimer, the term of this patent is extended or adjusted under 35 U.S.C. 154(b) by 7 days.

(21) Appl. No.: 10/889,601

(22) Filed: Jul. 12, 2004

(51) Int. Cl.⁷ .................... B01D 35/157; B01D 35/153
(52) U.S. Cl. .................... 210/234; 210/235; 210/443; 210/444; 210/249
(58) Field of Search ................ 210/232, 234, 210/235, 443, 444, 249

(56) References Cited

U.S. PATENT DOCUMENTS

| 3,184,064 | A | * | 5/1965 | Miller et al. ............... 210/136 |
| 4,556,484 | A | * | 12/1985 | Hunter et al. ............... 210/90 |
| 5,173,178 | A | * | 12/1992 | Kawashima et al. .......... 210/85 |
| 5,254,243 | A | * | 10/1993 | Carr et al. ................... 210/94 |
| 5,320,752 | A | * | 6/1994 | Clack et al. ................ 210/282 |
| 5,336,406 | A | * | 8/1994 | Stanford et al. ............. 210/235 |
| 5,753,107 | A | * | 5/1998 | Magnusson et al. ......... 210/109 |
| 5,826,854 | A | * | 10/1998 | Janvrin et al. ............. 251/149.9 |
| 6,432,305 | B1 | * | 8/2002 | Sumner ...................... 210/232 |

* cited by examiner

Primary Examiner—Thomas M. Lithgow
(74) Attorney, Agent, or Firm—Charles L. Schwab; Nexsen Pruet, LLC

(57) ABSTRACT

An under the counter water filter assembly with long flexible connecting conduits has a valve head which releasably hooks on brackets on a cabinet wall under the counter. The valve assembly can be removed from the brackets and the filter cartridge changed while standing and holding the cartridge assembly over the counter.

5 Claims, 5 Drawing Sheets

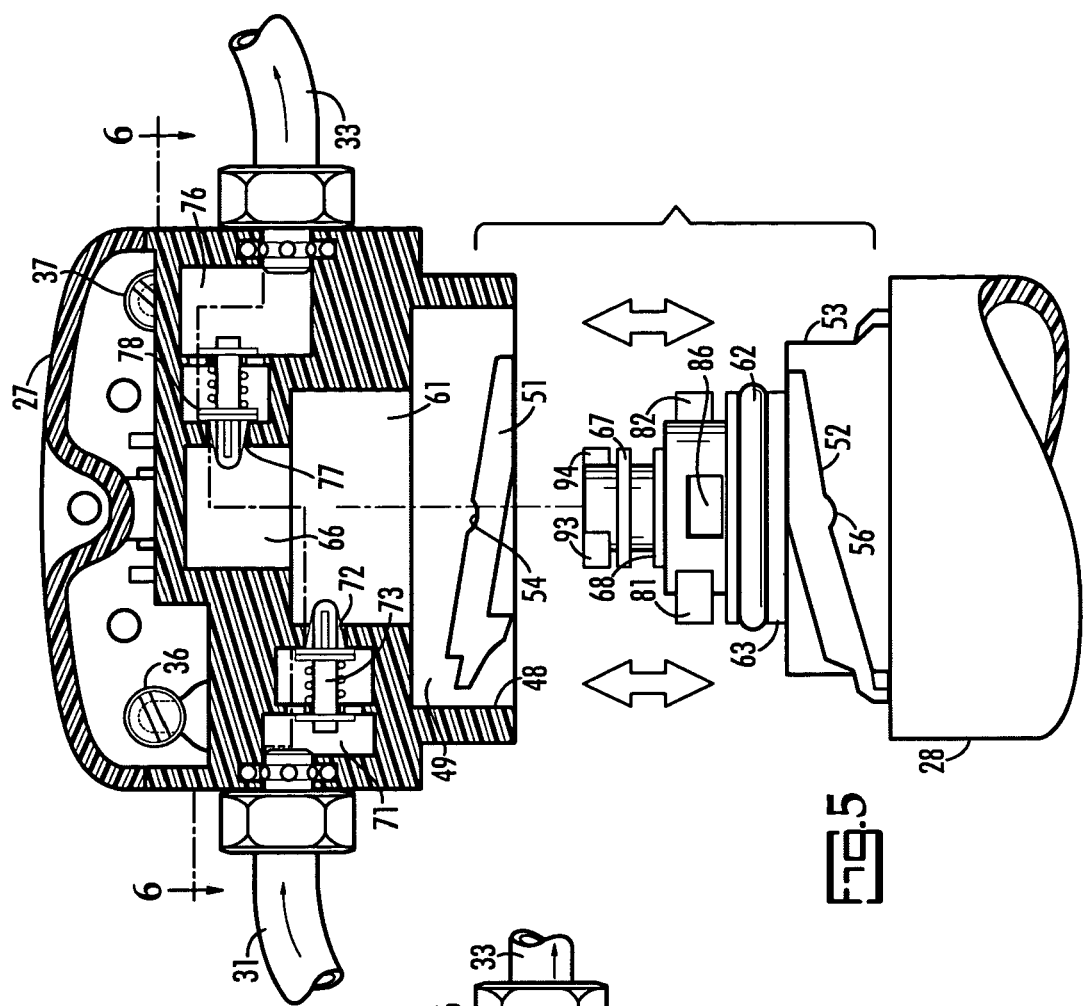
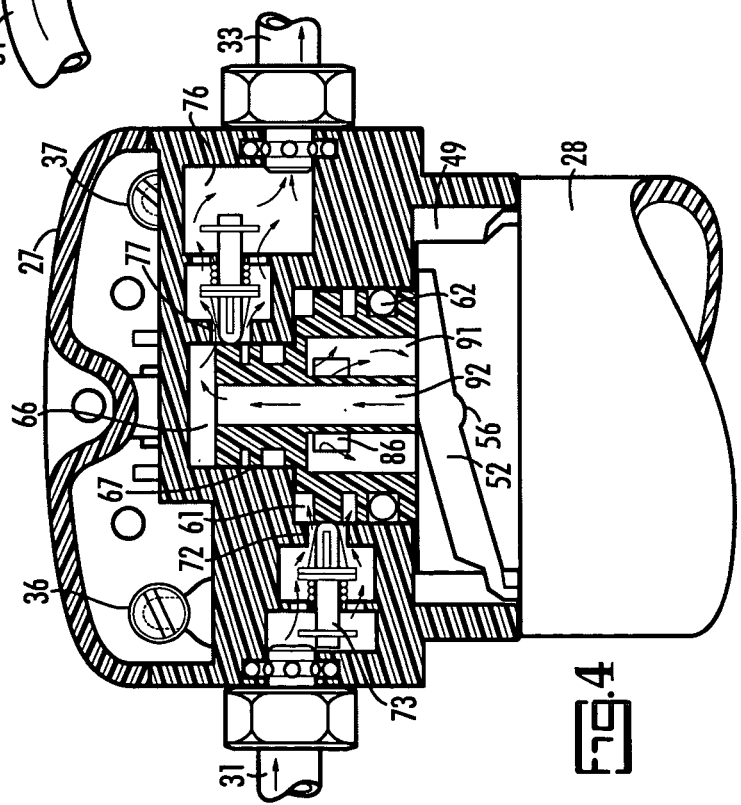

UNDER THE COUNTER FILTER INSTALLATION

BACKGROUND OF THE INVENTION

Health concerns have prompted people to be increasingly concerned about impurities in drinking water including waters supplied by city water facilities as well as untreated well water. A host of water conditioning or filtering devices are being marketed including modules that set on a counter and some that attach to water faucets. The filtering devices are designed to remove particles and/or undesirable impurities and typically use replaceable filtering apparatus. The kitchen counter is a heavily used space and water treatment equipment at the faucet or on the counter interferes with customary work being performed there.

SUMMARY OF THE INVENTION

This invention places the water filter below the counter of a typical kitchen cabinet. A valve head is releasably connected to an interior wall of the cabinet and has long flexible inlet and outlet conduits connected to a source of water and a water dispensing apparatus, such as a faucet. The valve head may have a hook and eye connection to the interior wall or other releasable connection permitting quick attachment and detachment while standing beside the counter. The valve head includes a threaded socket for releasable connection to a replaceable filter cartridge and includes internal inlet and outlet passages with check valves and openings interfacing with the inlet and outlet openings of the replaceable filter cartridge. The long flexible conduits permit a person standing beside the counter to quickly and easily remove the wall supported valve head and replace the replaceable filter cartridge.

BRIEF DESCRIPTION OF THE DRAWINGS

One embodiment of the invention is shown in the drawings in which:

FIG. 4 is a section taken on line 4—4 in FIG. 2;

FIG. 5 is a section view of the valve head similar to FIG. 4 with the filter cartridge removed;

DETAILED DESCRIPTION OF THE INVENTION

Figure 1:
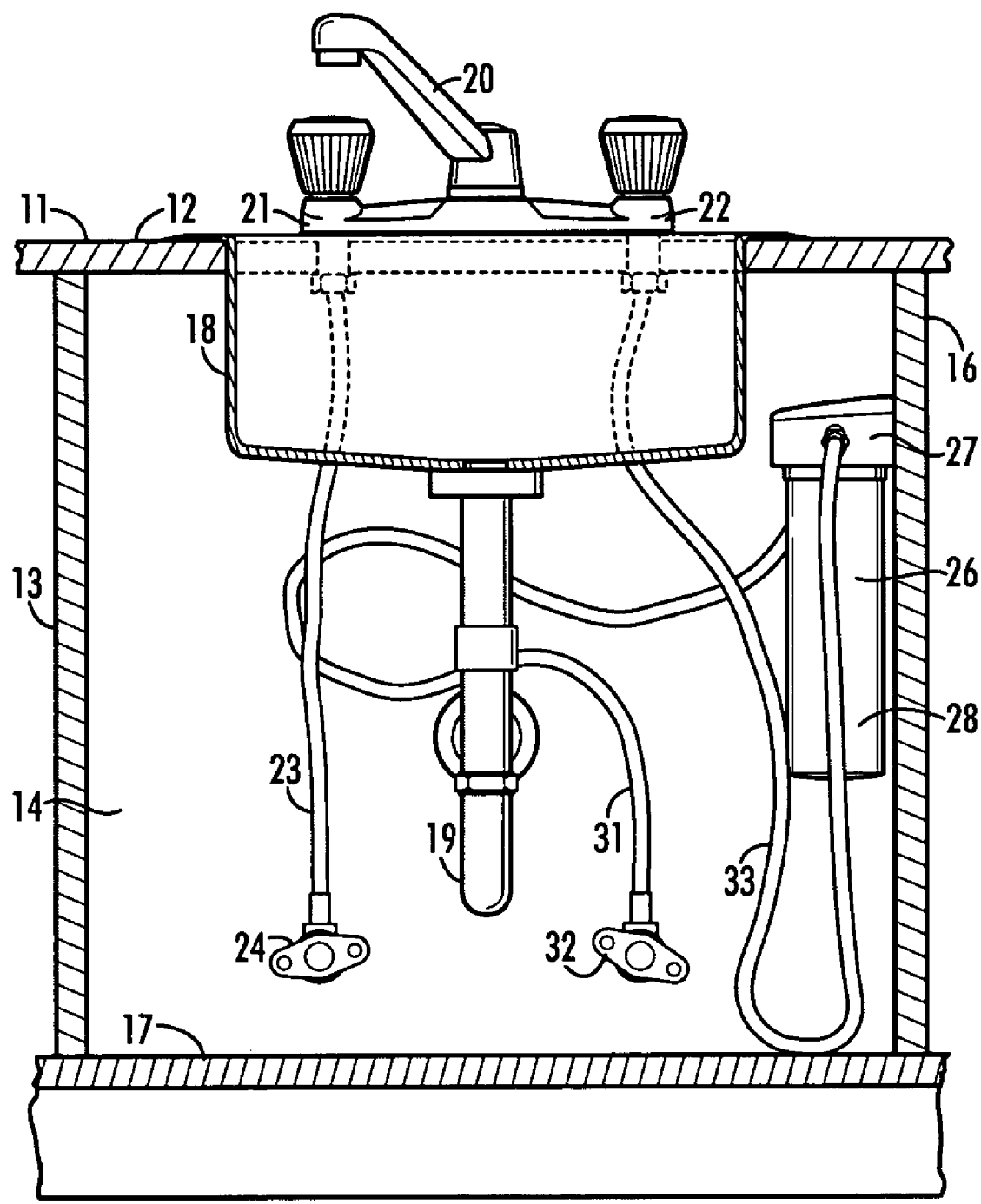
FIG. 1 is a vertical section of a kitchen cabinet showing the under counter installation of a filter assembly.

FIG. 1 is a vertical section of a kitchen cabinet 11 which includes a counter top 12, vertical side walls 13, 14, 16 and a floor 17. Also shown are a sink 18, a drain pipe 19 and a water dispenser or faucet 20 with hot and cold water valves 21, 22. The hot water valve 21 is supplied hot water by way of a conduit 23 having a shut off valve 24. Cold water is supplied to the faucet 19 through a filter assembly 26 which includes a valve head 27 releasably connected to the side wall 16 and a replaceable filter cartridge 28. Water is supplied to the valve head 27 through a long flexible water inlet conduit 31 connected to a shut off valve 32 and filtered water is delivered to the faucet 19 by a long flexible water outlet conduit 33 interconnecting the valve head 27 of the filter assembly 26 and the faucet 19.

Figure 2:
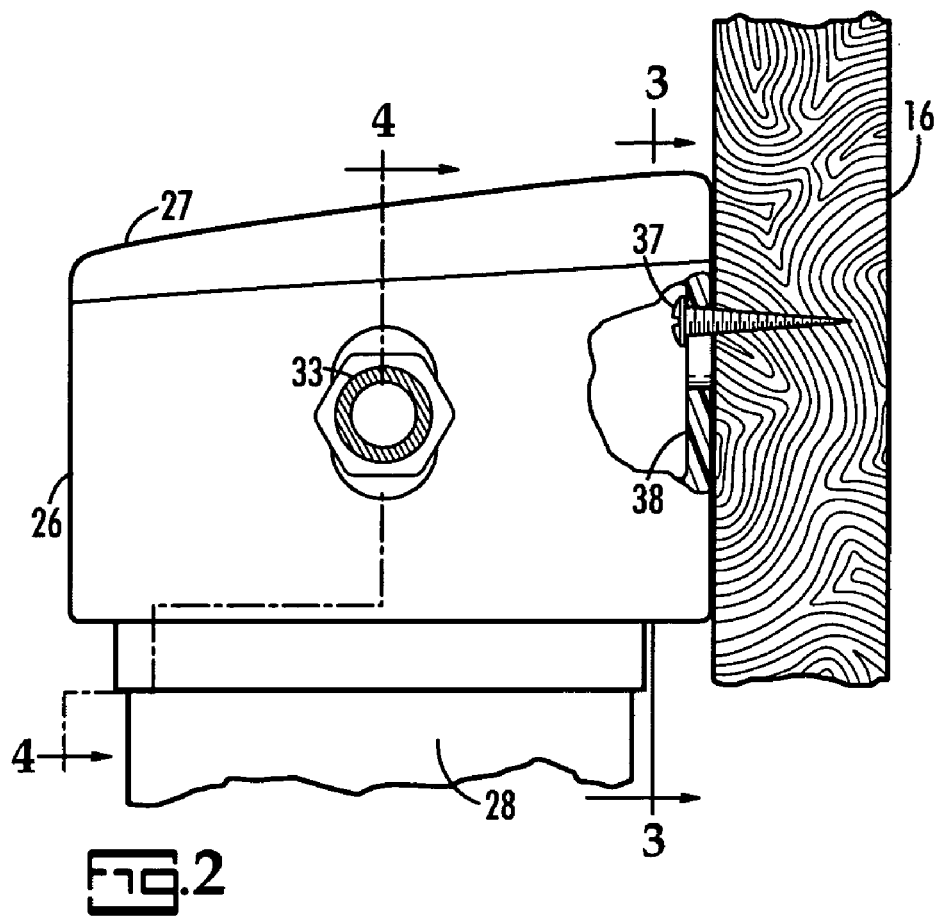
FIG. 2 shows the valve head releasably mounted on a vertical wall of the cabinet.
Figure 3:
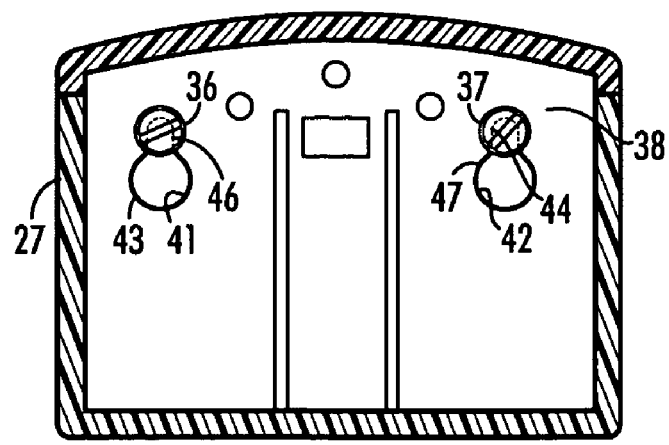
FIG. 3 is a section taken on line 3—3 in FIG. 2.

Referring to FIGS. 2 and 3, the valve head 27 of the filter assembly 26 is releasably supported or hooked on a pair of horizontally spaced supports or brackets in the form of round head screws 36, 37 partially threaded into the vertical wall 16. A vertical side wall 38 of the valve head 27 includes a pair of horizontally spaced openings 41, 42 having lower annular portions 43, 44, which are larger than the heads of the screws 36, 37 and upper slots 46, 47 which are wider than the shanks of the screws 36, 37 but smaller than the heads of the screws 36, 37. Sufficient horizontal space is provided between the heads of the screws 36, 37 and the wall 16 to permit the valve head 26 to slide freely up and down when hooking on or unhooking from the brackets formed by the screws 36, 37.

Referring to FIGS. 4 and 5, the valve head 27 has a stepped diameter interior cavity or socket 48 which mates with the stepped diameter upper end of the replaceable filter cartridge 28 to form axially spaced chambers. The largest diameter segment or chamber 49 of the socket 48 has a pair of diametrically opposite internal threads 51 adapted for engagement with diametrically opposite external threads 52 on a large diameter part 53 of the upper end of the replaceable filter cartridge 28. The internal threads 51 have an indentation 54 which mates with slight protrusions 56 on the external threads 52 of the filter cartridge 28 when it is threaded to an installed position in the valve head 27. In the installed position of the filter cartridge 28, an intermediate diameter segment or chamber 61 of the socket 48 is sealed off from the large diameter chamber 49 by an O-ring 62 on an intermediate diameter part 63 of the upper end of the filter cartridge 28 and a small diameter segment or chamber 66 of the socket 48 is sealed off from the intermediate diameter chamber 61 by an annular flange or land 67 on a small diameter part 68 of the filter cartridge 28.

The inlet conduit 31 is connected to the valve head 27 in water delivery relation to an inlet passage 71 in the valve head 27 which extends to an inlet port 72 of the chamber 61. A spring biased check valve 73 installed in the delivery passage closes the inlet port 72 when the filter cartridge 28 is removed from the valve head 27. The outlet conduit 33 is connected to the valve head 27 in water receiving relation to an outlet passage 76 which extends to an outlet port 77 in the chamber 66. A spring biased check valve 78 in the outlet passage 76 closes the outlet port 77 when the filter cartridge 28 is removed from the valve head 27. The closed position of the check valves 73, 78 is shown in FIG. 6.

Figure 6:
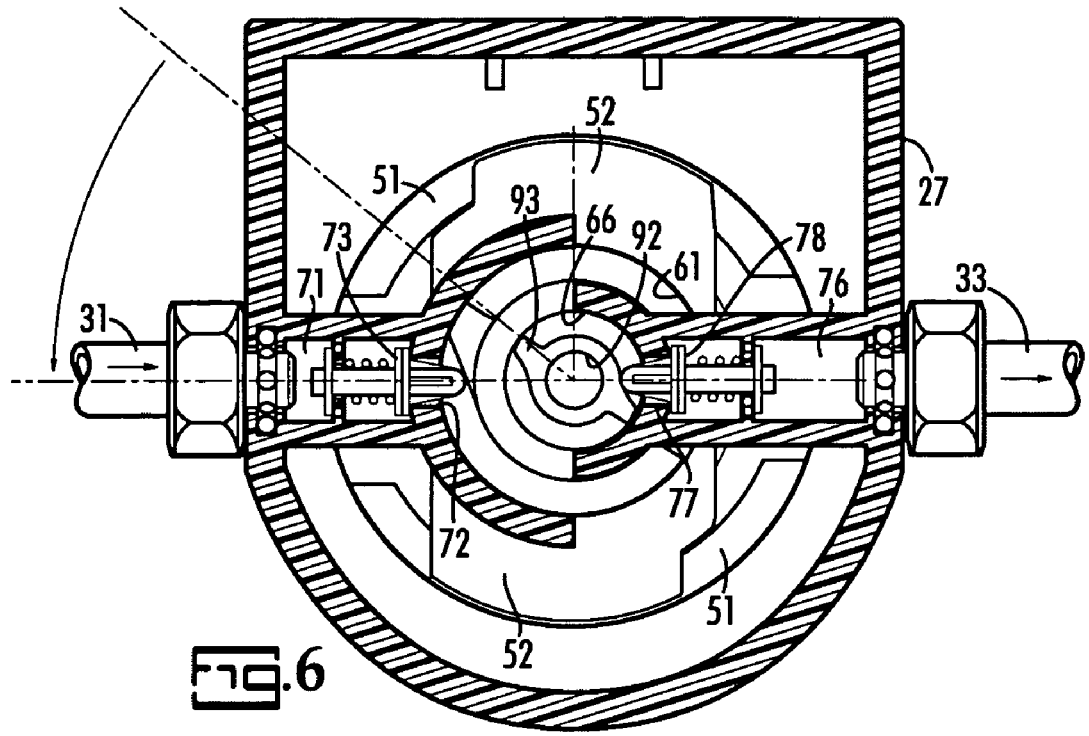
FIG. 6 is a section taken on line 6—6 in FIG. 5.
Figure 7:
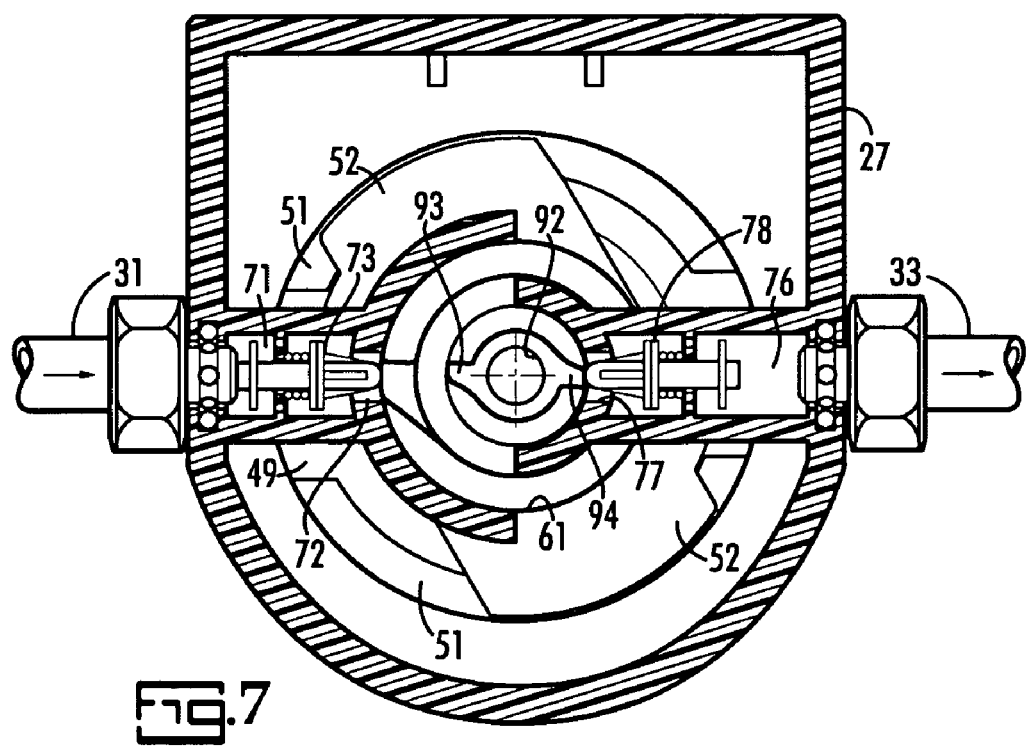
FIG. 7 is a section similar to FIG. 6 but showing the filter cartridge installed in the valve head.

FIGS. 5 and 6 show the filter cartridge 28 aligned for installation in the valve head 27; in which position the check valves 73, 78 close the ports 72, 77, respectively. Upon insertion of the filter cartridge 28 into the valve head 27 and rotation of the filter cartridge 28 about 45 degrees to its installed position shown in FIGS. 4 and 7, one of a pair of cams 81, 82 will move the check valve 73 to its open position, one of a pair of cams 83, 84 will move check valve 78 to its open position. O ring 62 and the annular flange 67 seal off the intermediate and small chambers 61, 66. Water flowing into the intermediate chamber 61 will pass through openings 86 in the intermediate diameter part 63 of the filter cartridge 28 and to its filter medium by way of an internal passage 91. Filtered water passes via an internal passage 92 to the small chamber 66 and thence through the port 77 which is now open due to the camming action of one of a pair of cams 93, 94 on the small diameter part 68 of the filter cartridge 28. The filter cartridge 28 can be threaded into the valve head 27 starting at one of two rotative positions which are 180° apart. This gives rise to the need for two cams for actuating each of the check valves 73, 78.

Figure 8:
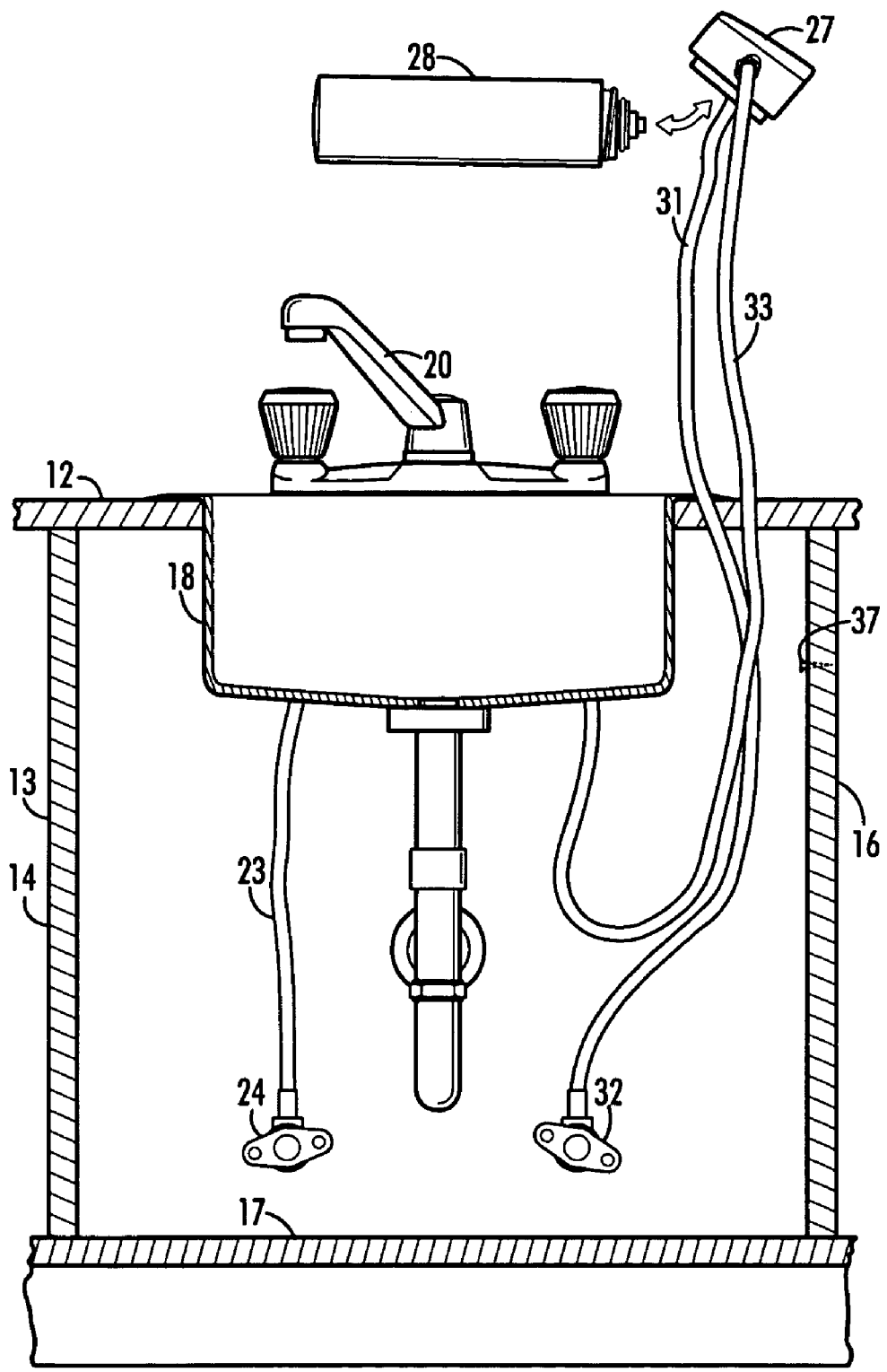
FIG. 8 is a view showing the separation of the filter cartridge from the valve head.

FIG. 8 shows the filter assembly 26 removed from the brackets 36, 37 and the filter cartridge 28 removed from the valve head 27. A person standing beside the counter 11 can hold the filter assembly over the sink 18 to prevent water dripping onto the floor or counter when changing filter cartridges. The amount of water dripping during a change of filter cartridges is virtually eliminated by the check valves 73, 78 in the valve head 27.

When the filter cartridge needs to be changed, a person standing next to the counter 12 lifts the filter assembly 26 off the supports 36, 37 and with a partial turn of the filter cartridge 28 it is separated from the valve head 27. After stalling a new replacement cartridge 28 in the valve head 27 the valve head is hooked on the supports 36, 37. The check valves 73, 78 close when the cartridge 28 is removed thereby preventing water discharge when changing cartridges. The provision of the check valve 73 in the input passage 71 allows changing of filter cartridge without closing the shut-off valve 32. The long flexible conduits 31, 33 not only facilitate changes of the filter cartridge while standing but also allow the filter assembly to be held over the sink 18 while changing the filter cartridge thereby preventing moisture droplets from the being deposited on the floor of the room where the filter system is installed.

What is claimed is:

1. A water filter arrangement for a cabinet having a counter on which a water dispensing apparatus is mounted and vertical walls and a floor defining a compartment beneath said counter, comprising:
    a valve head releasably connected to one of said vertical walls including
        a socket for receiving a filter cartridge,
        inlet and outlet passages with inlet and outlet ports, respectively, at said socket,
        a check valve in said inlet passage biased to a closed position in which flow toward said inlet port is prevented,
        a check valve in said outlet passage biased to a closed position in which flow through said outlet port is prevented,
    a flexible water inlet conduit connected to said inlet passage,
    a flexible water outlet conduit interconnecting said outlet passage and said water dispensing apparatus, and
    a replaceable filter cartridge having an end insertable into said socket, said end having an input opening for entry of unfiltered water and an output opening for discharge of filtered water, said end having a pair of cams engaging and opening said check valves, respectively, when said filter cartridge is inserted into said socket whereby said input and output openings are placed in fluid communication with said inlet and outlet passages, respectively, said check valves closing when said cartridge is removed from said socket
    said flexible conduits being sufficiently long to permit a person to disconnect said valve head from said wall and hold said valve head over said counter when replacing said filter cartridge.

2. The water filter arrangement of claim 1 wherein said socket has a pair of stepped diameter axially spaced chambers and wherein one of said ports opens into one of said chambers and the other of said ports opens into the other of said chambers.

3. A water filer arrangement for a cabinet having a counter on which a sink and a water dispenser are mounted and vertical walls defining a compartment beneath said counter, comprising:
    a water filter assembly including
        a replaceable filter cartridge having an externally threaded end presenting inlet and outlet openings and first and second cams;
        a valve head releasably mounted on one of said vertical walls having
            an interior threaded socket presenting inlet and outlet ports adapted for communication with said inlet and outlet openings, respectively, of said filter cartridge when said filter cartridge is in threaded engagement in said socket,
            inlet and outlet passages connected to said inlet and outlet ports, respectively,
            a first check valve in said inlet passage biased toward a closed position preventing flow through said inlet port in said socket,
            a second check valve in said outlet passage biased toward a closed position preventing flow through said outlet port in said socket,
        said first and second cams on said end of said filter cartridge engaging and opening said first and second check valves, respectively, when said filter cartridge is in threaded engagement in said threaded socket of said valve head,
    a flexible water inlet conduit connected to said inlet passage of said valve head and
    a flexible water outlet conduit interconnecting said outlet passage of said valve head and said water dispenser.

4. The valve head of claim 3 wherein said valve head is releasably mounted on a pair of brackets on said one wall.

5. The water filter arrangement of claim 3 wherein said socket has a pair of stepped diameter axially spaced chambers and wherein one of said ports opens into one of said chambers and the other of said ports opens into the other of said chambers.

* * * * *